US007769751B1

(12) United States Patent
Wu et al.

(10) Patent No.: US 7,769,751 B1
(45) Date of Patent: Aug. 3, 2010

(54) METHOD AND APPARATUS FOR CLASSIFYING DOCUMENTS BASED ON USER INPUTS

(75) Inventors: Jun Wu, Saratoga, CA (US); Zhengzhu Feng, Cupertino, CA (US); Quji Guo, Sunnyvale, CA (US); Zhe Qian, Saratoga, CA (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 11/334,157

(22) Filed: Jan. 17, 2006

(51) Int. Cl.
*G06F 7/00* (2006.01)
*G06F 17/30* (2006.01)

(52) U.S. Cl. .................. 707/728; 707/736; 707/748; 707/749; 707/750

(58) Field of Classification Search .................. 707/6, 707/722, 723, 731, 736, 748, 749, 750
See application file for complete search history.

(56) References Cited

U.S. PATENT DOCUMENTS

| | | | | |
|---|---|---|---|---|
| 5,642,502 A * | 6/1997 | Driscoll | ................. | 707/5 |
| 5,659,766 A * | 8/1997 | Saund et al. | ................. | 704/9 |
| 5,855,015 A * | 12/1998 | Shoham | ................. | 707/5 |
| 5,920,854 A * | 7/1999 | Kirsch et al. | ................. | 707/3 |
| 6,012,053 A * | 1/2000 | Pant et al. | ................. | 707/3 |
| 6,026,388 A * | 2/2000 | Liddy et al. | ................. | 707/1 |
| 6,104,989 A * | 8/2000 | Kanevsky et al. | ................. | 704/9 |
| 6,327,590 B1 * | 12/2001 | Chidlovskii et al. | ................. | 707/5 |
| 6,546,388 B1 * | 4/2003 | Edlund et al. | ................. | 707/5 |
| 6,665,837 B1 * | 12/2003 | Dean et al. | ................. | 715/234 |
| 6,718,324 B2 * | 4/2004 | Edlund et al. | ................. | 707/5 |
| 6,725,259 B1 * | 4/2004 | Bharat | ................. | 709/219 |
| 6,728,706 B2 * | 4/2004 | Aggarwal et al. | ................. | 707/5 |
| 6,751,614 B1 * | 6/2004 | Rao | ................. | 707/5 |
| 6,865,571 B2 * | 3/2005 | Inaba et al. | ................. | 707/5 |
| 6,873,982 B1 * | 3/2005 | Bates et al. | ................. | 707/5 |
| 6,910,037 B2 * | 6/2005 | Gutta et al. | ................. | 707/5 |
| 6,990,628 B1 * | 1/2006 | Palmer et al. | ................. | 715/234 |
| 7,080,071 B2 * | 7/2006 | Henrion et al. | ................. | 707/6 |
| 7,089,241 B1 * | 8/2006 | Alspector et al. | ................. | 707/7 |

(Continued)

OTHER PUBLICATIONS

Xin-Jing Wang, Grouping Web Image Search Result, Oct. 2004, ACM, 436-439.*

(Continued)

*Primary Examiner*—James Trujillo
*Assistant Examiner*—Jeffrey Burke
(74) *Attorney, Agent, or Firm*—Park, Vaughan & Fleming LLP

(57) ABSTRACT

One embodiment of the present invention provides a system that automatically classifies documents (such as web pages) based on user inputs. During operation, the system obtains a "classified" set of documents which are classified as relating to a specific topic. The system also obtains queries related to the specific topic. These queries produce "query results" which enable the user to access documents related to the query. The queries also include "click information" which specifies how one or more users have accessed the query results. The system uses this click information to identify documents in the classified set of documents which are not related to the specific topic or are off-topic. If such documents are identified, the system shifts the identified documents so that they are regarded as off-topic and/or spam, and removes the identified documents from the classified set of documents.

21 Claims, 4 Drawing Sheets

U.S. PATENT DOCUMENTS

| | | | |
|---|---|---|---|
| 7,111,025 B2 * | 9/2006 | Finlay et al. | 707/203 |
| 7,130,819 B2 * | 10/2006 | Wang et al. | 705/26 |
| 7,231,399 B1 * | 6/2007 | Bem et al. | 707/102 |
| 2004/0024752 A1 * | 2/2004 | Manber et al. | 707/3 |
| 2004/0059697 A1 * | 3/2004 | Forman | 706/46 |
| 2005/0097435 A1 * | 5/2005 | Prakash et al. | 715/500 |
| 2005/0165766 A1 * | 7/2005 | Szabo | 707/3 |
| 2005/0203888 A1 * | 9/2005 | Woosley et al. | 707/3 |
| 2005/0234904 A1 * | 10/2005 | Brill et al. | 707/5 |
| 2006/0149710 A1 * | 7/2006 | Koningstein et al. | 707/3 |
| 2006/0248072 A1 * | 11/2006 | Brewer et al. | 707/5 |
| 2007/0100812 A1 * | 5/2007 | Simske et al. | 707/5 |
| 2007/0112753 A1 * | 5/2007 | Liu et al. | 707/5 |
| 2007/0112758 A1 * | 5/2007 | Livaditis | 707/5 |
| 2007/0112867 A1 * | 5/2007 | Evans et al. | 707/200 |
| 2007/0124283 A1 * | 5/2007 | Gotts et al. | 707/3 |
| 2008/0195601 A1 * | 8/2008 | Ntoulas et al. | 707/5 |

OTHER PUBLICATIONS

Frederick Marckini, Google Interview, Feb. 27, 2004.*
Direct Hit Technoloy Overview, Searchengines.com, Aug. 19, 2000.*

* cited by examiner

METHOD AND APPARATUS FOR CLASSIFYING DOCUMENTS BASED ON USER INPUTS

BACKGROUND

1. Field of the Invention

The present invention relates to techniques for classifying documents, such as web pages. More specifically, the present invention relates to a method and an apparatus for classifying documents based on user inputs to facilitate subsequent queries involving the documents.

2. Related Art

Electronic commerce is a big business. The total volume of sales through the Internet in the United States is estimated to have reached nearly 70 billion dollars in 2004. A large portion of these sales resulted from search engine referrals. To obtain search engine referrals, a user typically enters keywords of interest into a search engine, and the search engine uses these keywords to search for and return "relevant" web pages to the user.

A large fraction of all searches are related to only a few commonly-occurring topics, in particular, entertainment-related topics, such as computer games, movies and music. Unfortunately, "spam pages" are a significant problem for searches related to these commonly occurring topics. A large percentage (sometimes 90%) of web pages returned by search engines for these commonly occurring topics are "spam pages," which exist only to misdirect traffic from search engines. These spam pages are purposely designed to mislead search engines by achieving high rankings during searches related to common topics. However, these spam pages are typically unrelated to topics of interest, and they try to get the user to purchase various items, such as pornography, software, or financial services.

Spam pages are bad for search engine users because they make it hard for the users to retrieve the information that they need, which causes a frustrating search experience. Furthermore, spam pages are bad for search engines because they consume valuable web-crawling time and distort web page rankings in search engine results.

Unfortunately, it is very hard to determine which pages are spam pages because spam pages are purposely designed to achieve high rankings. They are also typically designed to circumvent automatic techniques for detecting spam pages. Consequently, existing techniques for automatically detecting spam web pages are generally ineffective.

Hence, what is needed is a method and an apparatus for effectively determining whether a web page is a spam page.

SUMMARY

One embodiment of the present invention provides a system that automatically classifies documents (such as web pages) based on both topics and user inputs. During operation, the system obtains a "classified" set of documents which are classified as relating to a specific topic. The system also obtains queries related to the specific topic. These queries produce "query results" which enable the user to access documents related to the query. The queries also include "click information" which specifies how one or more users have accessed the query results. The system uses this click information to identify documents in the classified set of documents which are not related to the specific topic or are off-topic. If such "pseudo-related" documents are identified, the system shifts the identified documents so that they are regarded as off-topic and/or spam, and removes the identified documents from the classified set of documents.

In a variation on this embodiment, obtaining the classified set of documents involves: (1) obtaining an initial set of queries for the specific topic; (2) using a search engine to retrieve an initial set of documents for the initial set of queries; (3) producing an initial feature vector from the initial set of documents; (4) using the initial feature vector to classify a corpus of documents to produce the classified set of documents; and (5) extracting a new feature vector from the set of documents generated in step (4), and repeating the process until the set of documents generated in consecutive iterations are substantially identical. (More specifically, the process can be repeated as long as more than a pre-specified threshold percentage (or portion) of documents have been shifted to another topic.)

In a further variation, classifying a document involves annotating the document to indicate whether the document is related to the specific topic.

In a further variation, an annotation in a given document indicates whether the given document: (1) is related to the specific topic; (2) is a spam document; or (3) is not related to the specific topic or is off-topic. (Note that a spam document (or spam page) is defined as a document (or web page) which is designed to misdirect traffic from a search engine.)

In a variation on this embodiment, if more than a pre-specified threshold percentage (or portion) of documents have been shifted to another topic, the system produces an updated feature vector from the updated classified set of documents. The system then repeats the method using the updated feature vector instead of the initial feature vector.

In a variation on this embodiment, the click information includes: a "click-through rate," which indicates the number of times a given document is selected divided by the number of times the given document is presented for selection. It also includes a "click duration," which indicates an amount of time that a user remains on a given document while accessing query results.

In a variation on this embodiment, the system processes a new query by first determining whether the new query is related to the specific topic. The system then searches for documents that match terms in the new query to produce query results. While producing these query results, if the new query is related to the specific topic, the system adjusts relevancy scores for documents based on annotations associated with the documents.

In a further variation, determining whether the new query is related to the specific topic involves applying a query detector that uses Bloom filters to terms in the new query. (Note that in general other types of lookup structures, such as a hash table, can be applied to terms in the new query to determine if the new query is related to the specific topic.)

In a variation on this embodiment, prior to receiving the new query, the system constructs the Bloom filter by: (1) identifying queries which trigger documents in the classified set of documents; (2) identify common n-grams in the identified queries; (3) excluding commonly occurring n-grams from the identified n-grams; and (4) building a Bloom filter based on the remaining identified n-grams. (Note that the term "n-gram" refers to a specific string of n consecutive words in a document.)

In a variation on this embodiment, adjusting relevancy scores involves boosting relevancy scores for documents which are annotated as being related the specific topic, and reducing relevancy scores for documents which are annotated as being spam documents, and changing the rankings of search results based on the adjusted relevancy scores.

DETAILED DESCRIPTION

Figure 1:
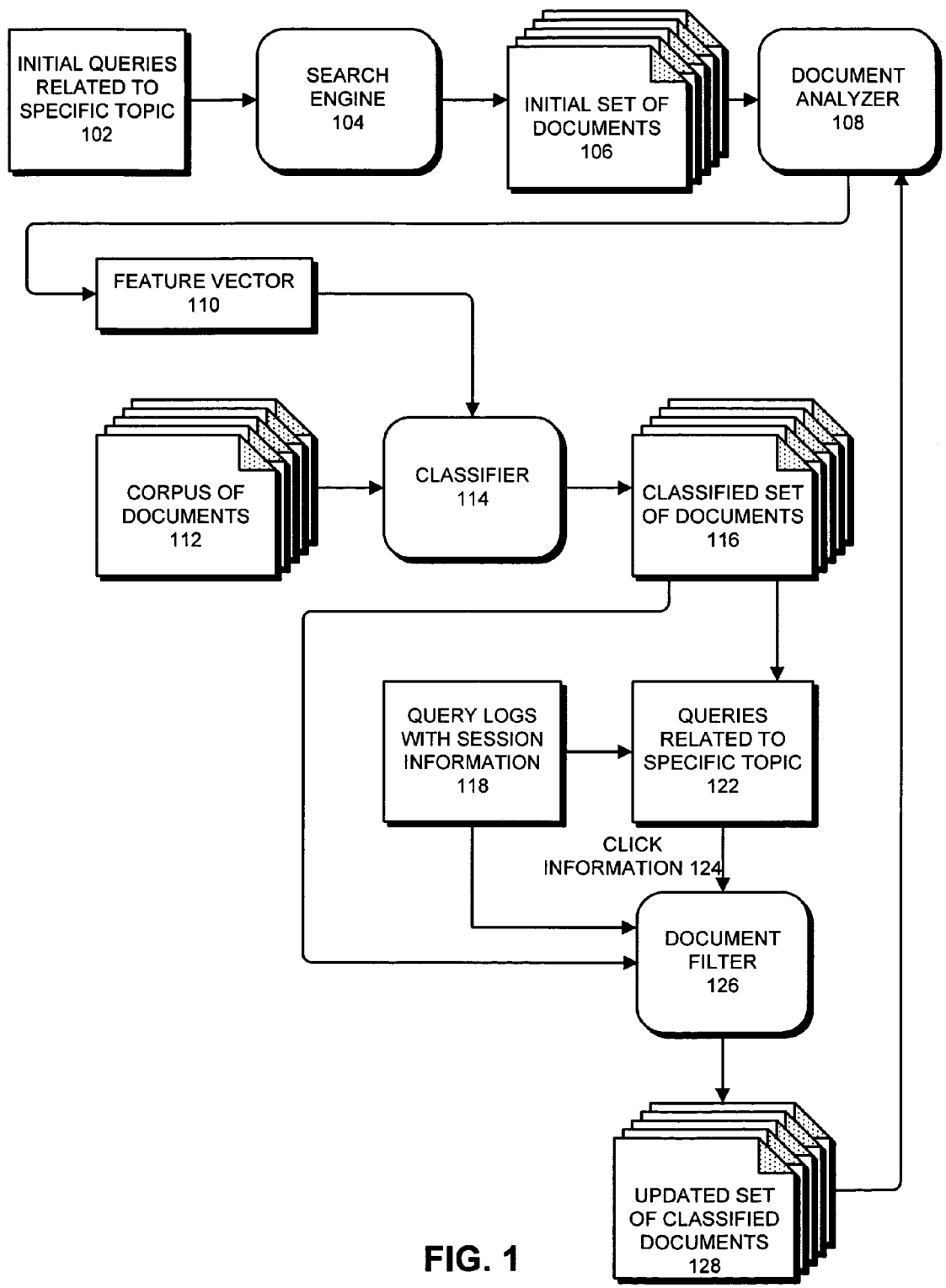
FIG. 1 presents a diagram illustrating the process of classifying web pages based on user inputs in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system and/or a switch in a telecommunication system. This includes, but is not limited to, magnetic and optical storage devices such as disk drives, magnetic tape, CDs (compact discs) and DVDs (digital versatile discs or digital video discs).

Overview

Existing techniques for classifying web pages only focus on the content of the web pages and references contained within the web pages. For example, centroid-based document classification has been widely used to facilitate information retrieval (see E. Han and G. Karypis, "Centroid-Based Document Classification: Analysis & Experimental Results," *PKDD* 2000, pp. 424-431). Other methods have been used, such as Bayesian network classifiers (see N. Freidman, D. Geiger, and S. Goldszmidt, "Bayesian Networks Classifiers," *Machine Learning*, 29, pp 131-161, 1997) and Latent Semantic Analysis (LSA) based methods (see Bellegarda, J. R., "A Multi-Span Language Modeling Framework for Large Vocabulary Speech Recognition," *IEEE Transactions on Speech and Audio Processing*, 6(5) 1998, pp. 456-467.)

The present invention improves upon these existing classification techniques by using humans inputs, in particular queries and associated navigational operations, to further refine the classification process.

In one embodiment of the present invention, we first pick several user queries of a topic (Q0) and extract all documents (C0) containing keywords in the queries automatically, for example by using a search engine. We then construct a feature vector from this set of documents and use it to classify the entire corpus or index of documents in the search engine. This produces a more complete set (C1) of documents for the initial topic (Q0).

We then look at the user inputs, or queries and identify those inputs (Q1) which match documents in the selected set (C1). Next, we use "click information" associated with queries in Q1, such as the number of clicks and the total click duration for each document in C1 to filter the documents in C1. For example, if the click duration of a document is too short or the number of clicks on a document is too small, we can consider the document to be "off-topic." Note that by using human inputs in this way, the present invention produces a higher classification accuracy than prior art techniques.

A direct application of the present invention is in web searching. For example, we can build a query filter to determine if a query is related to a specific topic of interest. If so, we can overweight pages (documents) on this topic, while underweighting the off-topic pages, even those that contain keywords in the query.

This new technique is described in more detail below.

Classifying Web Pages

Figure 2:
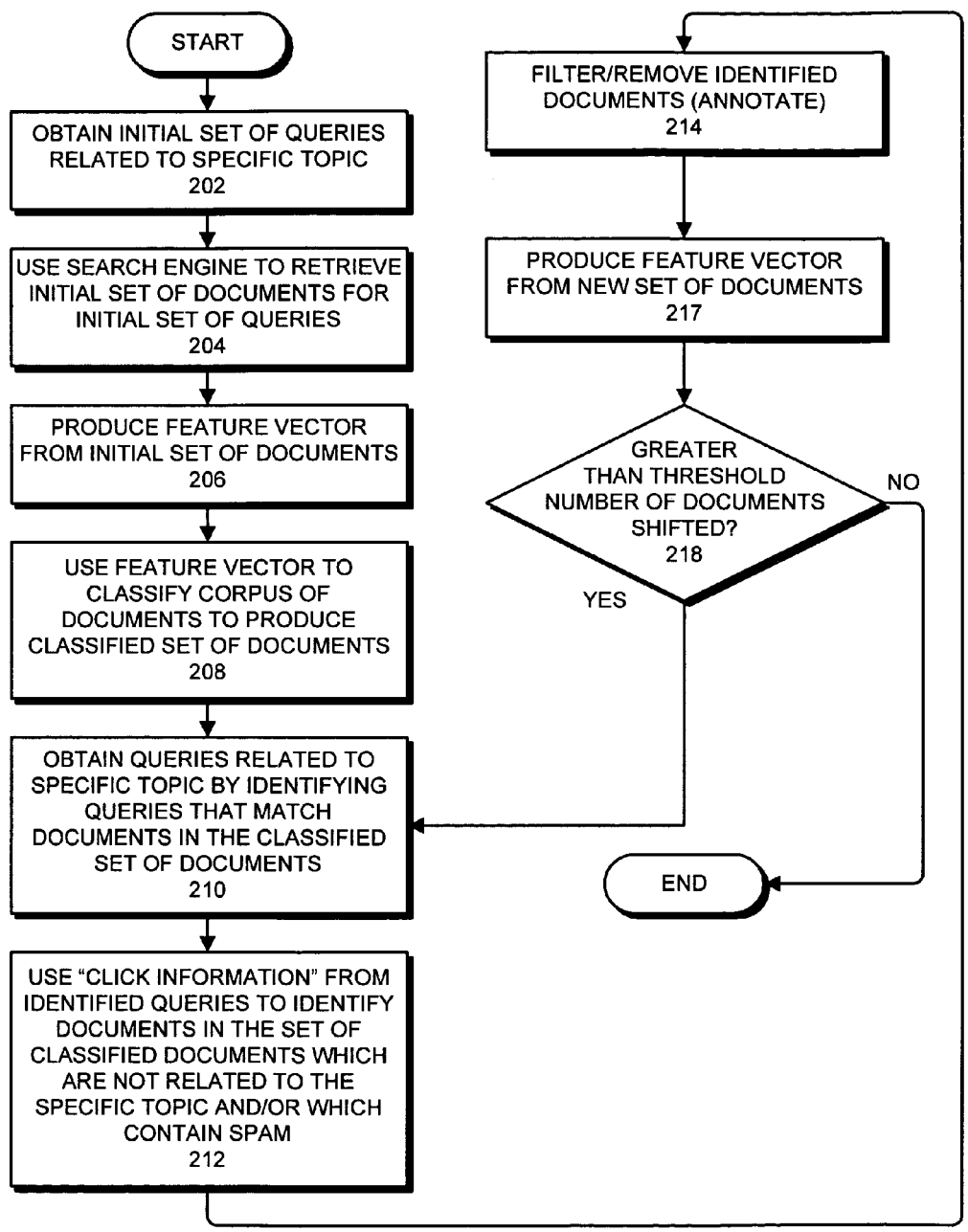
FIG. 2 presents a corresponding flow chart illustrating the process of classifying web pages based on user inputs in accordance with an embodiment of the present invention.

One embodiment of the present invention provides a new process for classifying web pages based on user inputs. Referring to the diagram in FIG. 1 and the flow chart in FIG. 2, the process starts by obtaining an initial set of "seed" queries 102 which are related to a specific topic of interest (step 202). Next, the system uses a search engine 104 (or some other type of query-processing mechanism) to retrieve an initial set of documents 106 which are produced by the initial set of queries (step 204).

The system then feeds this initial set of documents 106 into a document analyzer 108 to produce a "feature vector" 110 for the initial set of documents 106 (step 206). Note that a number of different types of feature vectors can be produced to represent multi-dimensional data. One embodiment of the present invention uses a feature vector 110, which has elements derived from the frequencies of specific "terms" (words) which occur in the initial set of documents 106. Note that feature vector 110 can also include similar elements for pairs of terms (bi-grams) occurring in a document, and in general can include elements for n-grams occurring in the document.

For example, in one embodiment of the present invention, a feature-vector element for a given term t can be $TF(t)*IDF(t)$, wherein $TF(t)$ is the "term frequency" for the term t, which indicates the average number of times the term t occurs in each document in the initial set of documents 106, and wherein $IDF(t)$ is the "inverse document frequency" for term t, which reduces the effects of terms that occur frequently across all documents. For example, in one embodiment of the present invention $IDF(t)=\log(|D|/|D_t|)$, wherein $|D|$ is the total number of documents and $|D_t|$ is the number of documents containing the term t. Note this formulation for an element in the feature vector can be generalized for n-grams containing n terms. Also note that $TF(t)$ may be smoothed to avoid a data sparseness problem. For example, $TF(t)$ can be smoothed by using the Good-Turing discounting technique.

Next, the system feeds feature vector 110 into a classifier 114, which uses feature vector 110 to classify a corpus of documents 112 (step 208). This can involve calculating feature vectors for all documents in the corpus, and then classifying documents which have feature vectors which are similar to feature vector 110 as being related to the topic of interest. This process produces a "classified" set of documents 116 which have been classified as relating to the topic of interest.

Note that these classified documents can be "annotated" to indicate they relate to the specific topic of interest. For example, these annotations can indicate that a given document: (1) is related to the specific topic; (2) is a spam document; or (3) is not related to the specific topic or is off-topic.

Next, the system obtains queries 122 related to the specific topic of interest (step 210). In one embodiment of the present invention, this involves identifying queries 122 (from query logs with session information 118) which generate query results that match documents in the classified set of documents 116.

Next, the system feeds "click information" 124 from the identified queries 122 into a document-filtering module 126 which filters out irrelevant/spam pages. For example, this click information 124 can include a "click-through rate," which indicates the number of times a given document is selected divided by the number of times the given document is presented for selection. It can also include a "click duration," which indicates an amount of time that a user remains on a given document while accessing query results. If either of these rates is low, the associated web page is likely to be a spam page.

Document-filtering module 126 uses this click information 124 to identify documents in the classified set of documents 116 which are not related (according to user actions) to the specific topic or which are spam documents (step 212). Note that for computer-game-related queries, 80% to 90% of all pages returned by a search can be spam pages, which can be filtered out by using this process.

The system then filters/removes these identified documents to produce an updated classified set of documents 128 (step 214). This can involve changing the annotations on these documents to indicate that the identified documents are not related to the specific topic, or that the identified documents are spam documents.

The system then feeds the updated classified set of documents 128 into document analyzer 108 to produce a new feature vector 110 (step 217).

Next, the system determines if the percentage (or portion) of documents that have been shifted exceeds a threshold (step 218). If not, very few documents have been shifted. In this case, it is not worthwhile doing further processing, and the process terminates.

Otherwise, the system then returns to step 210 to repeat the process.

Constructing a Bloom Filter

Figure 3A:
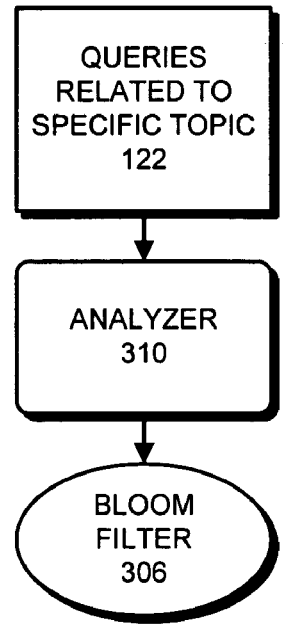
FIG. 3A illustrates the process of constructing a Bloom filter in accordance with an embodiment of the present invention.

FIG. 3A illustrates the process of constructing a Bloom filter in accordance with an embodiment of the present invention. The system first feeds queries 122 (which are related to a specific topic) into an analyzer 310. Analyzer 310 then constructs a Bloom filter 306 based on n-grams in the queries 122. This process is described in more detail below with reference to FIG. 4.

Search Engine

Figure 3B:
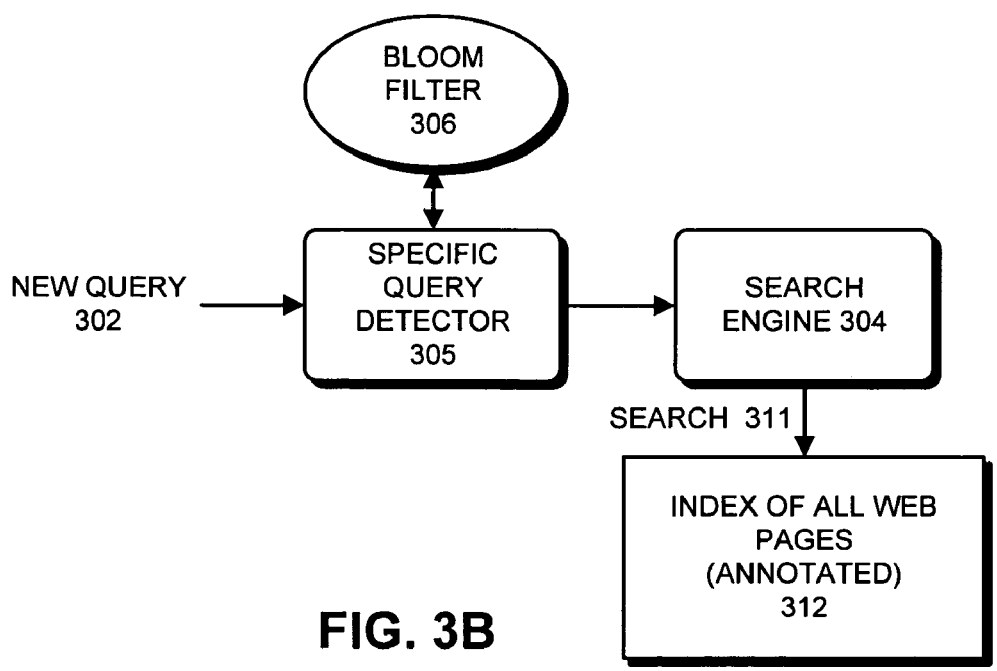
FIG. 3B illustrates a system which is configured to determine if a query is related to a specific topic and to use this information during a subsequent search operation in accordance with an embodiment of the present invention.

FIG. 3B illustrates a system which is configured to determine if a query is related to a specific topic and to use this information during a subsequent search operation in accordance with an embodiment of the present invention.

First, a new query 302 is fed into a specific query detector 305, which uses Bloom filter 306 to determine if new query 302 is related to a specific topic. If the new query 302 is related to the specific topic, the system annotates the query with a "specific topic tag" and sends the annotated query to search engine 304. Otherwise, if the new query is not related to the specific topic, the new query is sent to search engine 304 without being annotated.

Search engine then performs a search 311 for the query across a corpus of documents pages (web pages) 312. If the query is tagged to indicate that it is related to the specific topic, results generated by the query are ranked differently than those for a regular query. This process is described in more detail below with reference to FIG. 5. However, we first describe how to construct a Bloom filter.

Bloom Filter

Figure 4:
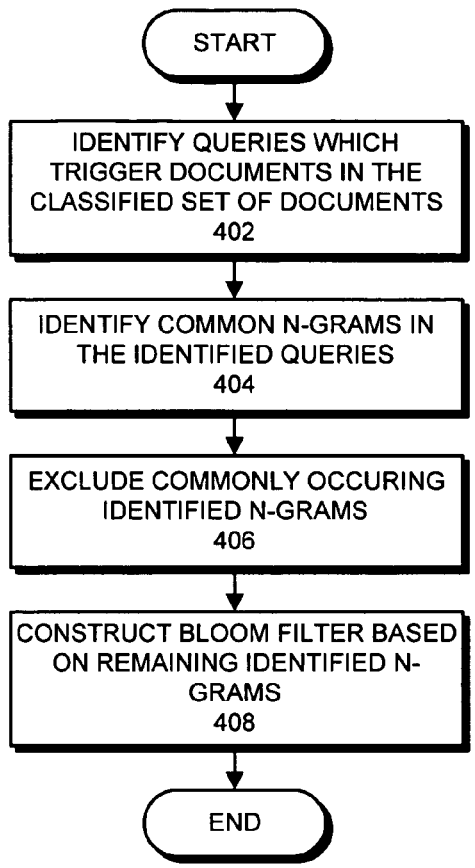
FIG. 4 presents a flow chart illustrating the process of constructing a Bloom filter in accordance with an embodiment of the present invention.

FIG. 4 presents a flow chart illustrating the process of constructing a Bloom filter in accordance with an embodiment of the present invention. First, the system identifies queries 122 which trigger documents in the classified set of documents 116 (step 402). Next, the system identifies common n-grams which occur in the identified queries (step 404). The system also excludes commonly occurring n-grams from the identified n-grams (step 406). Finally, the system builds a Bloom filter 306 based on the remaining identified n-grams (step 408). Note that techniques for constructing Bloom filters are generally well-known in the art, so details about the construction of the Bloom filter will not be discussed further in this specification.

Processing a New Query

Figure 5:
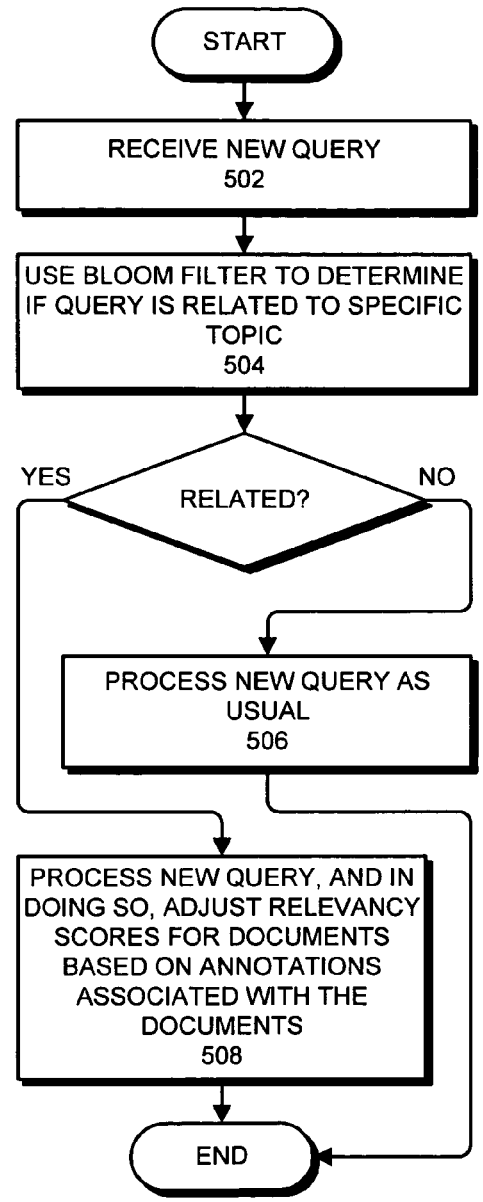
FIG. 5 presents a flow chart illustrating the process of processing a new query in accordance with an embodiment of the present invention.

FIG. 5 presents a flow chart illustrating the process of processing a new query 302 in accordance with an embodiment of the present invention. The system first receives a new query 302 from a user (step 502). Next, the system uses Bloom filter 306 to determine whether new query 302 is related to a specific topic of interest (step 504). If not, the query is processed as usual (step 506).

However, if the new query 302 is related to the specific topic of interest, the system processes the new query 302, and in doing so, adjusts the relevancy scores for documents based on annotations associated with the documents (step 508). This can involve boosting relevancy scores for documents which are annotated as being related the specific topic, and reducing the relevancy scores for documents which are annotated as being spam documents. (Relevancy scores for other documents which are not related to the specific topic are not adjusted.)

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method executed on one or more processors for automatically classifying documents based on topics and user inputs, comprising:

receiving a set of documents which are classified as relating to the specific topic;

producing an initial feature vector that corresponds to frequency of a term's occurrence in the set of documents;

using the initial feature vector to classify another set of documents to produce an initial classified set of documents;

receiving click information associated with a set of queries related to the specific topic, wherein the click information includes a click-through rate at which a query result is selected after being presented and a click duration indicating an amount of time during which the query result is accessed;

using the click information to remove off-topic documents in the set of documents to obtain an updated set of documents, wherein a document is off-topic if the click-through rate or click duration associated with the document indicates the document is off-topic;

determining an updated feature vector using the updated set of documents; and re-classifying the classified set of documents using the updated feature vector when the percentage of documents identified as off-topic exceeds a threshold which is greater than 0, otherwise retaining the initial classified set of documents.

2. The method of claim 1, wherein a document in the set of documents includes an annotation to indicate whether the document is related to the specific topic.

3. The method of claim 2, wherein an annotation in a given document indicates whether the given document:
is related to the specific topic;
is a spam document; or
is not related to the specific topic or is off-topic.

4. The method of claim 1, wherein the query results are generated by identifying queries that match documents in the set of documents.

5. The method of claim 1, wherein the method further comprises:
receiving a new query;
determining whether the new query is related to the specific topic; and
processing the new query to produce query results, wherein if the new query is related to the specific topic, processing the new query involves adjusting relevancy scores for documents based on annotations associated with the documents.

6. The method of claim 5, wherein determining whether the new query is related to the specific topic involves applying a query detector that uses Bloom filters to terms in the new query.

7. The method of claim 6, wherein prior to receiving the new query, the method further comprises constructing the Bloom filter by:
identifying queries which trigger documents in the set of documents;
identifying common n-grams in the identified queries;
excluding commonly occurring n-grams from the identified n-grams; and
building a Bloom filter based on the remaining identified n-grams.

8. The method of claim 5, wherein adjusting relevancy scores involves:
boosting relevancy scores for documents which are annotated as being related the specific topic;
reducing relevancy scores for documents which are annotated as being spam documents; and
changing the rankings of search results based on the adjusted relevancy scores.

9. The method of claim 1, wherein the documents are web pages.

10. A computer-readable storage medium storing instructions that when executed by a computer cause the computer to perform a method for automatically classifying documents based on topics and user inputs, the method comprising:
receiving a set of documents which are classified as relating to a specific topic;
producing an initial feature vector that corresponds to frequency of a term's occurrence in the set of documents;
using the initial feature vector to classify another set of documents to produce an initial classified set of documents;
receiving click information associated with a set of queries related to the specific topic, wherein the click information includes a click-through rate at which a query result is selected after being presented and a click duration indicating an amount of time during which the query result is accessed;
using the click information to remove off-topic documents in the set of documents to obtain an updated set of documents, wherein a document is off-topic if the click-through rate or click duration associated with the document indicates the document is off-topic;
determining an updated feature vector using the updated set of documents; and
re-classifying the classified set of documents using the updated feature vector when the percentage of documents identified as off-topic exceeds a threshold which is greater than 0, otherwise retaining the initial classified set of documents.

11. The computer-readable storage medium of claim 10, wherein a document in the set of documents includes an annotation to indicate whether the document is related to the specific topic.

12. The computer-readable storage medium of claim 11, wherein an annotation in a given document indicates whether the given document:
is related to the specific topic;
is a spam document; or
is not related to the specific topic or is off-topic.

13. The computer-readable storage medium of claim 10, wherein the query results are generated by identifying queries that match documents in the set of documents.

14. The computer-readable storage medium of claim 10, wherein the method further comprises:
receiving a new query;
determining whether the new query is related to the specific topic; and
processing the new query to produce query results, wherein if the new query is related to the specific topic, processing the new query involves adjusting relevancy scores for documents based on annotations associated with the documents.

15. The computer-readable storage medium of claim 14, wherein determining whether the new query is related to the specific topic involves applying a query detector that uses Bloom filters to terms in the new query.

16. The computer-readable storage medium of claim 15, wherein prior to receiving the new query, the method further comprises constructing the Bloom filter by:
identifying queries which trigger documents in the set of documents;
identifying common n-grams in the identified queries;
excluding commonly occurring n-grams from the identified n-grams; and
building a Bloom filter based on the remaining identified n-grams.

17. The computer-readable storage medium of claim 14, wherein adjusting relevancy scores involves:
boosting relevancy scores for documents which are annotated as being related the specific topic;
reducing relevancy scores for documents which are annotated as being spam documents; and changing the rankings of search results based on the adjusted relevancy scores.

18. The computer-readable storage medium of claim 10, wherein the documents are web pages.

19. A computer system that automatically classifies documents based on user inputs, comprising:
a processor;
a memory;
a document-receiving mechanism configured to receive a set of documents which are classified as relating to a specific topic;
a feature-vector producing mechanism configured to produce an initial feature vector that corresponds to frequency of a term's occurrence in the set of documents;
a classifying mechanism configured to use the initial feature vector to classify another set of documents to produce an initial classified set of documents;
a query-receiving mechanism configured to receive click information associated with a set of queries related to the specific topic, wherein the q click information includes a click-through rate at which a query result is selected after being presented and a click duration indicating an amount of time during which the query result is accessed;
a removing mechanism configured to use the click information to remove off-topic documents in the set of documents to obtain an updated set of documents, wherein a document is off-topic if the click-through rate or the click duration associated with the document indicates that the document is off-topic;
a determination mechanism configured to determine an updated feature vector using the updated set of documents; and
a re-classification mechanism configured to re-classifying the classified set of documents using the updated feature vector when the percentage of documents identified as off-topic exceeds a threshold which is greater than 0, otherwise retaining the initial classified set of documents.

20. The computer system of claim 19, wherein the apparatus further comprises a query-processing mechanism, wherein the query-processing mechanism is configured to:
receive a new query;
determine whether the new query is related to the specific topic; and to
process the new query to produce query results, wherein if the new query is related to the specific topic, processing the new query involves adjusting relevancy scores for documents based on annotations associated with the documents, wherein the annotations indicate whether the documents are related to the specific topic.

21. The computer system of claim 20, wherein while adjusting the relevancy scores for documents, the query-processing mechanism is configured to:
boost relevancy scores for documents which are annotated as being related the specific topic;
reduce relevancy scores for documents which are annotated as being spam documents; and to
change the rankings of search results based on the adjusted relevancy scores.

* * * * *